(12) United States Patent
Vanderploeg et al.

(10) Patent No.: US 9,296,563 B2
(45) Date of Patent: Mar. 29, 2016

(54) COUPLING ARRANGEMENT FOR SELF-ALIGNING CONVEYOR BELT COVER

(75) Inventors: Susan J. Vanderploeg, Grand Rapids, MI (US); Eric D. Erikson, Lewisburg, MI (US); Edward T. Mol, Marne, MI (US)

(73) Assignee: Handstand Innovations, LLC, Grand Rapids, MI (US)

( * ) Notice: Subject to any disclaimer, the term of this patent is extended or adjusted under 35 U.S.C. 154(b) by 445 days.

(21) Appl. No.: 13/293,117

(22) Filed: Nov. 9, 2011

(65) Prior Publication Data

US 2012/0125741 A1 May 24, 2012

Related U.S. Application Data

(63) Continuation of application No. PCT/US2011/000803, filed on May 5, 2011.

(60) Provisional application No. 61/343,857, filed on May 5, 2010.

(51) Int. Cl.
| | |
|---|---|
| *B65G 15/34* | (2006.01) |
| *B65G 15/46* | (2006.01) |
| *B65G 15/30* | (2006.01) |
| *B65G 15/36* | (2006.01) |
| *G09F 19/22* | (2006.01) |
| *G09F 11/26* | (2006.01) |

(52) U.S. Cl.
CPC ............. *B65G 15/30* (2013.01); *B65G 15/34* (2013.01); *B65G 15/36* (2013.01); *G09F 11/26* (2013.01); *G09F 19/22* (2013.01); *B65G 2207/04* (2013.01); *B65G 2207/26* (2013.01); *Y10T 156/10* (2015.01)

(58) Field of Classification Search
None
See application file for complete search history.

(56) References Cited

U.S. PATENT DOCUMENTS

| | | | | |
|---|---|---|---|---|
| 4,034,617 A * | 7/1977 | Guyer | ................... | B29C 66/723 198/844.2 |
| 5,244,080 A * | 9/1993 | Bierbaum | .............. | B29D 29/06 198/502.1 |
| 5,836,440 A * | 11/1998 | Mindich | ................ | B65G 15/08 198/819 |
| 5,906,269 A * | 5/1999 | Zabron | ................. | B29C 70/081 198/846 |
| 6,216,852 B1 * | 4/2001 | David | .................... | B65G 15/08 198/847 |

* cited by examiner

*Primary Examiner* — Kavel Singh
(74) *Attorney, Agent, or Firm* — Rohm & Monsanto, PLC

(57) ABSTRACT

A conveyor has a belt arranged to be urged around conveyor rollers, and a belt cover formed of an endless loop of fabric material and is in frictional communication over the belt. The belt cover is formed of two plies that are arranged to be adhered to one another in an edge region of the belt cover. The communication between the belt cover and the belt has a coefficient of friction of ~0.50. A message is printed on the outer ply of the belt cover. In addition, an antimicrobial material is disposed on the belt cover, and is formed of silver nanoparticles embedded in a polyurethane film having a thickness of ~0.5 mil.

26 Claims, 9 Drawing Sheets

COUPLING ARRANGEMENT FOR SELF-ALIGNING CONVEYOR BELT COVER

RELATIONSHIP TO OTHER APPLICATION

This application is a continuation-in-part patent application, and claims the benefit, of PCT/US2011/000,803 filed on May 5, 2011, which is based on U.S. Provisional Ser. No. 61/343,857 filed May 5, 2010, Conf. No. 5334 (Foreign Filing License Granted). The disclosure in the identified PCT and United States Provisional patent applications are incorporated herein by reference.

BACKGROUND OF THE INVENTION

1. Field of the Invention

This invention relates generally to conveyor systems, and more particularly, to a conveyor system of the type that employs a conveyor belt cover that in some embodiments has antimicrobial properties and displays a printed decorative feature or message.

2. Description of the Prior Art

The desire for incorporating advertising and other messages or indicia onto conveyor systems has long been recognized. The prior art has numerous times addressed the need to enhance conveyors, particularly at retail check-out stands, with decorative and advertising elements that increase visual appeal or stimulate sales of products and services.

Many of the prior art efforts directed toward achieving a suitable display of information at retail checkout locations involve the application of indicia on the checkout conveyor belt. In some such instances, printing is performed directly on the checkout conveyor belt, and in other prior art approaches preprinted material is adhered or otherwise attached to the checkout conveyor belt.

In one known arrangement, preprinted static cling sheets are adhered to the checkout conveyor belt by electrostatic attraction. It is well-known, however that electrostatic attraction is unreliable. The quality of the adhesion is inherently weak, in no small measure is a function of ambient temperature and humidity, and is attacked by the need to stretch when traveling over pulleys. Ultimately, abrasion caused by products being placed on the checkout conveyor belt during the checkout procedure will cause lifting of the static cling sheets, particularly at the leading edges, resulting in buckling, binding, and total separation. The separated static cling sheets can collect under the checkout conveyor belt requiring at least partial disassembly of the checkout stand to effect clearing.

In another known arrangement, a cover is arranged to surround the entire checkout conveyor belt, and is releasably attached thereto. Plural attachments of the cover to the checkout conveyor belt in this known arrangement are made as perimeter and width attachment components. Numerous problems are present in the practice of the known arrangement. For example, the cover will buckle and tend to deviate laterally (i.e., transverse to the direction of conveyance). Nevertheless, even when the cover is installed to achieve adequate initial alignment, stretching and distortion of the cover on the belt will result from the cover being loaded, and from being driven about the support rollers, ultimately resulting in axial deviation that in relatively short order will require the checkout stand to be shut down for repair or replacement of the cover. Such covers must be produced to exacting standards to improve the likelihood that replacement covers track with the moving checkout conveyor belt. However, as stated, shear forces ultimately will separate the cover from the checkout conveyor belt, and in instances where strong adhesives are used, damage to the checkout conveyor belt will result.

An obvious problem with known arrangements that use permanent print directly on the checkout conveyor belt is that the elevated cost of the base belt and the need for installation by skilled individuals prohibit frequent change of the message. In addition, some known methods of applying indicia to a checkout conveyor belt require formation of recesses in the surface of the belt that accommodates the indicia, and such recesses are not only costly to achieve, but also form crevices where bacteria and other microbes accumulate and grow. Efforts have been made in the art to cover the indicia with transparent plastic, but this renders the checkout conveyor belt thicker, less flexible, and more costly.

It is a further problem with known checkout conveyor arrangements that consumer articles placed thereon, such as meat packages and liquids, will be deposited on the conveyor, providing nutrition to colonies of bacteria and other microbes. Customers are fully aware of such spills on the conveyor, and are often adverse to permitting the foodstuffs that they intend to purchase from communicating directly with the conveyor. Such customers would be comforted by an effective antimicrobial feature in the checkout conveyor.

It is, therefore, an object of this invention to provide a system for stimulating sales of products or services at retail checkout locations.

It is another object of this invention to provide a system for installing indicia on a checkout conveyor belt wherein the message thereon is simply and inexpensively changeable at frequent intervals that are significantly shorter than the life of the checkout conveyor belt.

It is also an object of this invention to provide a system for installing indicia on a checkout conveyor belt that does not have crevices where bacteria will accumulate.

It is a further object of this invention to provide a system for installing indicia on a checkout conveyor belt that does not require modification of the base checkout conveyor belt.

It is an additional object of this invention to provide a low cost cover for a base conveyor belt that also has relatively low cost of maintenance due to the elimination of the need for alignment adjustment.

It is a still further object of this invention to provide a system for installing indicia on a checkout conveyor belt that does not require adhesion to the base checkout conveyor belt, and that readily can be removed without impacting the utility of the base checkout conveyor belt.

It is yet a further object of this invention to provide a system for installing indicia on a checkout conveyor belt that covers the base checkout conveyor belt substantially entirely, is sufficiently flexible so as not to impose significant loading on the belt drive system, but is sufficiently rigid so as not to curl or bind at the axial edges.

It is yet another object of this invention to provide a cover system for a base conveyor belt wherein the conveyor belt cover aligns itself axially in the direction of conveyance, particularly after having temporarily been subjected to loading.

It is also another object of this invention to provide a system for installing indicia on a checkout conveyor belt whereby the installation does not require removal, modification, or replacement of the base checkout conveyor belt.

It is yet an additional object of this invention to provide a system for installing indicia on a checkout conveyor belt whereby the installation can quickly be achieved by persons of limited mechanical skills.

It is still another object of this invention to provide an antimicrobial feature to a conveyor arrangement.

SUMMARY OF THE INVENTION

The foregoing and other objects are achieved by this invention which provides, in accordance with a first aspect thereof, a conveyor arrangement of the type having a plurality of conveyor rollers and a base conveyor belt arranged to be urged endlessly around the plurality of conveyor rollers. The conveyor arrangement is provided with a conveyor belt cover formed of inner and outer plies. The inner ply has first and second inner ply termination edges and is arranged to overlie, and to be in frictional communication with, the base conveyor belt. The first and second inner ply termination edges are arranged in proximity to one another to form a closed loop that overlies the base conveyor belt. In addition, the outer ply is arranged to overlie the inner ply and to have first and second outer ply termination edges. The first outer ply termination edges extend beyond the first inner ply termination edges, and the second outer ply termination edges are disposed to leave a portion of the second inner ply termination edges exposed.

In one embodiment of the invention, the inner ply is formed of a single ply polyester fabric material carcass. In some such embodiments, the outer ply is formed of a material having a PVC coating.

In accordance with a method aspect of the invention, there is provided a method of forming an endless conveyor loop. The method includes the steps of:

forming a two-ply cover having first and second ends and formed of inner and outer plies;

removing a portion of the inner ply in the region of the first end of the two-ply cover;

removing a portion of the outer ply in the region of the second end of the two-ply cover;

applying an adhesive to at least one of the inner and outer plies; and overlying the outer ply over the inner ply over the applied adhesive.

In one embodiment of this method aspect of the invention, the step of removing a portion of the inner ply in the region of the first end of the two-ply cover extends for approximately one inch.

Further in accordance with the invention, there is provided a conveyor arrangement of the type having a plurality of conveyor rollers. The conveyor arrangement is provided with a base conveyor belt arranged to be urged endlessly around the plurality of conveyor rollers. In addition, there is provided a conveyor belt cover formed of an endless loop of material and arranged in frictional communication over the base conveyor belt.

In a further apparatus embodiment of the invention, the conveyor belt cover is formed of a single ply polyester fabric material carcass. In a further embodiment, the conveyor belt cover has incorporated therein a monofilament woven into the weft of the fabric material carcass, the weft being in a direction transverse to the direction in which the base conveyor belt is urged endlessly around the plurality of conveyor rollers.

In an advantageous embodiment of the invention, the conveyor belt cover has a structural rigidity characteristic greater than 140 p/cm$^2$ in the weft direction, as determined in accordance with DIN 53362. These characteristics of the conveyor belt cover facilitate a self-aligning feature of the inventive conveyor belt cover.

In operation, the conveyor belt cover has an inner surface for forming the frictional communication with the base conveyor belt, and an outer surface for communicating with articles to be conveyed. The conveyor belt cover is installed to a tensile force of approximately between 1 and 1.5 pounds/inch of width, which corresponds to an overall elongation of approximately ~0.1%. The frictional communication between the inner surface of the conveyor belt cover and the base conveyor belt corresponds to a maximum dynamic coefficient of friction of approximately between ~0.47 and ~0.52. A message, which may constitute advertising material, is printed on the outer surface of the conveyor belt cover.

In a further embodiment of the invention, there is provided an antimicrobial material disposed on the outer surface of the conveyor belt cover. The antimicrobial material is, in an advantageous embodiment of the invention, formed of a selectable combination of silver and silver oxide nanoparticles embedded in a polymeric film. In other embodiments, the antimicrobial material further comprises zinc oxide particles embedded in the polymeric film. The polymeric film includes a polymer selected from the group consisting of a polyurethane, a vinyl, an acrylic, a polyester, a melamine, a polyolefin, a polycarbonate, and an epoxy, and has a thickness of approximately ~0.5 mil.

In one embodiment of the invention, the polymeric film is initially (i.e., prior to being installed onto the fabric material carcass) in a liquid state, and includes a solvent selected from the group consisting of water, methyl ethyl ketone, methyl isobutyl ketone, acetone toluene, ethyl acetate, methyl acetate, propel acetate, n-methyl 1-2 pyrrolidone, tetrahydrofuran, glycol, and glycol ethers.

In a still further embodiment, the base conveyor belt is provided with an antimicrobial material disposed on an outer surface thereof. Additionally, in some embodiments, a message is printed on the outer surface.

In accordance with a further aspect of the invention, there is provided a conveyor arrangement of the type having a plurality of conveyor rollers. The conveyor arrangement is provided with a base conveyor belt arranged to be urged endlessly around the plurality of conveyor rollers, the base belt having an inner surface that communicates with the conveyor rollers, and an outer surface. A layer of antimicrobial material is deposited on the outer surface of the base conveyor belt.

In one embodiment of this further aspect of the invention, there is further provided a conveyor belt cover formed of an endless loop of fabric material and arranged in frictional communication with the layer of antimicrobial material on the base conveyor belt. Also, in a still further embodiment, a layer of antimicrobial material is deposited on the conveyor belt cover. The antimicrobial material on the base conveyor belt has, in one embodiment, a thickness of approximately 0.5 mil.

In a highly advantageous embodiment of the invention, the conveyor belt cover has incorporated therein a monofilament weft that increases structural rigidity. The weft is disposed in a direction transverse to the direction in which the base conveyor belt is urged endlessly around the plurality of conveyor rollers. As previously noted, a message is printed on the conveyor belt cover in some embodiments of the invention. Also, in other embodiments, a message is printed on the outer surface of the base conveyor belt.

In accordance with a still further aspect of the invention, there is provided a conveyor arrangement of the type having a plurality of conveyor rollers. The conveyor arrangement includes a base conveyor belt that is urged endlessly around the plurality of conveyor rollers, and has a conveyance surface that travels in a substantially axial direction of conveyance. There is additionally provided a conveyor belt cover formed of an endless loop of fabric material and arranged in frictional communication over the base conveyor belt. The conveyor belt cover is displaceable with respect to the base conveyor belt in an axial direction.

In a highly advantageous embodiment of this still further aspect of the invention, the conveyor belt cover is displaceable with respect to the base conveyor belt in a transaxial direction. Such transaxial displaceability enables a self-alignment feature of the invention. Self-alignment is facilitated by configuring the conveyor belt cover to have a structural rigidity characteristic that is greater than approximately ~140 p/cm², as determined in accordance with DIN 53362 in the weft direction. Preferably, the frictional communication between an inner surface of the conveyor belt cover and the base conveyor belt corresponds to a maximum dynamic coefficient of friction of approximately between ~0.47 and ~0.52.

The conveyor belt cover has, in an advantageous embodiment of this still further aspect of the invention, a layer of antimicrobial material deposited on an outer surface thereof. Additionally, in other embodiments, the base conveyor belt has a further layer of antimicrobial material deposited on its outer surface. In still further embodiments, there is provided a message printed on the outer surface of the base conveyor belt.

BRIEF DESCRIPTION OF THE DRAWING

Comprehension of the invention is facilitated by reading the following detailed description, in conjunction with the annexed drawing, in which.

DETAILED DESCRIPTION

Figure 1:
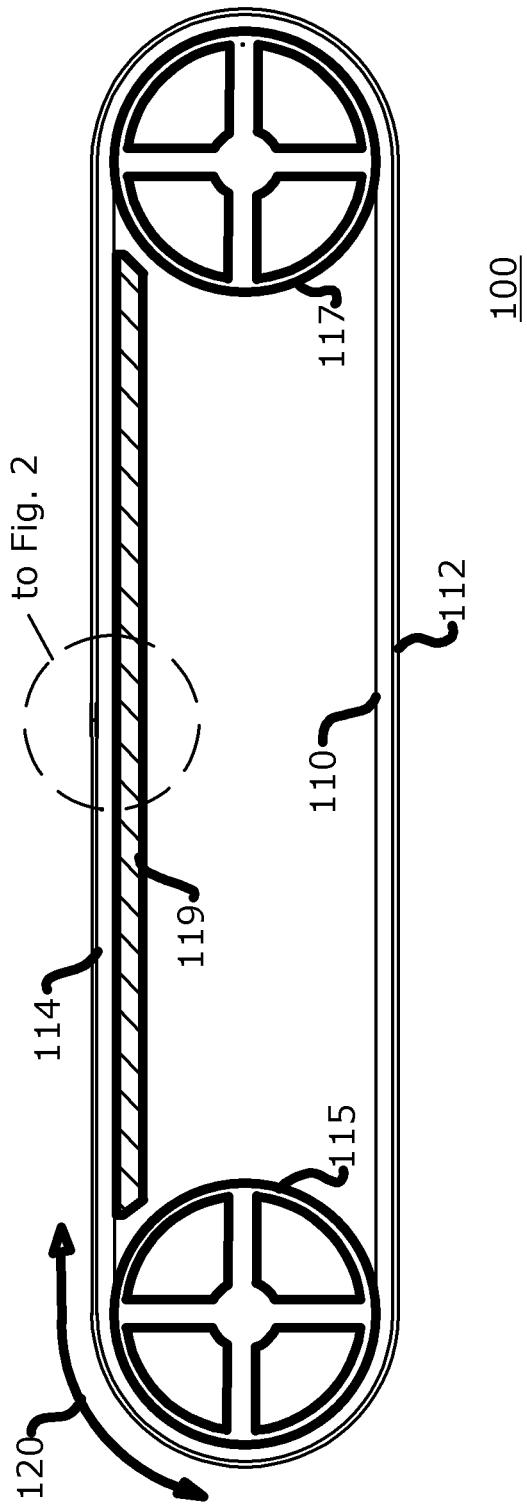
FIG. 1 is a simplified schematic representation of a conveyor arrangement constructed in accordance with the principles of the invention, that is useful in the context of a retail checkout conveyor.

FIG. 1 is a simplified schematic representation of a conveyor arrangement 100 constructed in accordance with the principles of the invention, that is useful in the context of a retail checkout conveyor. Checkout conveyors are used in checkstands in retail locations, and are the pedestals (not shown in this figure) on which retail customers (not shown) place items (not shown) that they desire to purchase. The items desired to be purchased are, after being placed on conveyor arrangement 100, conveyed to the cash register operator (not shown) by a conveyor belt, as will be described below.

As shown in FIG. 1, conveyor arrangement 100 is arranged to have a base conveyor belt 110 with a belt cover 112 thereover disposed over rollers 115 and 117. The top portion 114 of base conveyor belt 110 is supported by a slider bed 119. In response to actuation of one or both of rollers 115 and 117, base conveyor belt 110 and belt cover 112 travel in the directions of two-headed arrow 120 over slider bed 119.

Figure 2:
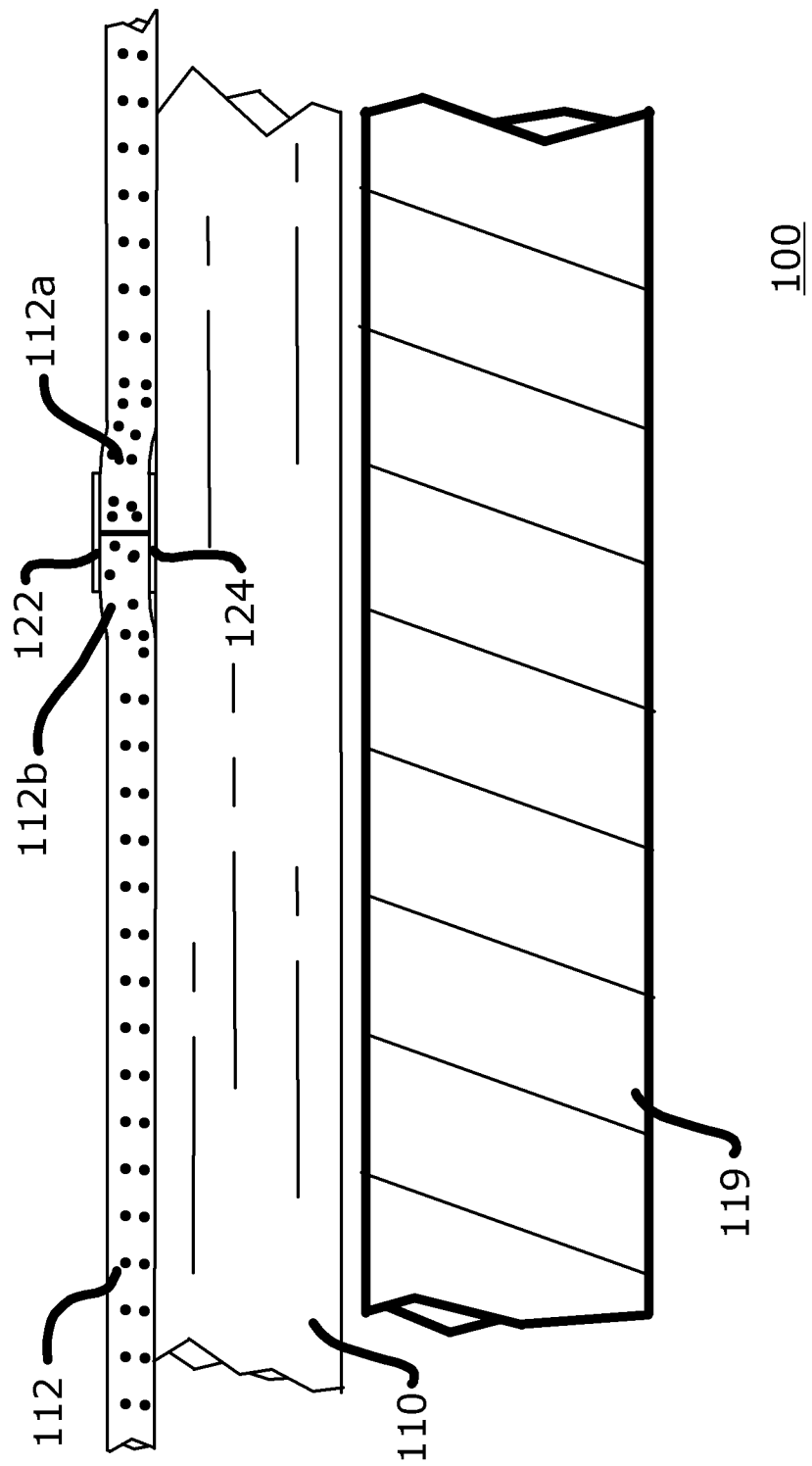
FIG. 2 is an enlargement of a portion of the embodiment of FIG. 1.

In this embodiment of the invention, belt cover 112 is made into an endless loop that surrounds base conveyor belt 110 by attachment of its trailing and leading edges (not specifically designated in this figure). A specific illustrative embodiment of this attachment is represented in FIG. 2, discussed below.

In one embodiment of the invention, belt cover 112 is formed of a PVC coated fabric material. In some embodiments, the belt cover serves as a protective coat over base conveyor belt 110 that can be replaced several times within the period of the useful life of base conveyor belt 110. In a highly advantageous embodiment, belt cover 112 is provided with printed art and/or text on one side. In a further embodiment of the present aspect of the invention, there is provided a polymeric coating (not specifically designated) that is applied to a thickness of approximately ~0.5 mil. In some embodiments of the invention, the coating has enhanced abrasion resistant properties.

In a further specific illustrative embodiment of the invention, belt cover 112 is provided with a non-degrading antimicrobial material (not shown) that has been embedded in an applied coating (not shown in this figure). The antimicrobial is, in one embodiment, combined with the polymer prior to application, and comprises a silver (AU) anode particle of approximately between 4 and 6 nanometers.

The belt cover, after installation, travels on the outside of, and substantially concurrently with, base conveyor belt 110. It is an aspect of the present invention that once installed, belt cover 112 is not attached to base conveyor belt 110, and the rotation of belt cover 112 will be the result of a friction communication between the external surface of base conveyor belt 110 and the internal surface of belt cover 112. However, for each revolution of base conveyor belt 110 around rollers 115 and 117, belt cover 112 must travel a longer distance, that is responsive to the effective increased roller diameter as a result of the thickness of base conveyor belt 110. In addition, the longer distance of travel of belt cover 112 is responsive to the weight of the articles (not shown) placed on conveyor arrangement 100 by the customer (not shown).

In a specific illustrative embodiment of the invention, the tensile force applied to belt cover 112 is approximately between 1 pound/inch and 1.5 pounds/inch. This tensile force is achieved during the installation process, when the cover is tensioned until an elongation of approximately 0.1% is exhibited by belt cover 112. The maximum dynamic coefficient of friction between the base conveyor belt 110 and belt cover 112 is approximately between ~0.47 and ~0.52. This range of friction is achieved between the bare exposed polyester carcass of belt cover 112 and the polymeric coating (not specifically designated) of base conveyor belt 110. In addition, in an advantageous embodiment of the invention, the flexural rigidity of belt cover 112 is greater than approximately ~140 p/cm² in the weft direction, as determined in accordance with DIN 53362. The flexural rigidity in the weft direction is approximately ~1.405 times that of the warp direction. As will be described below, this structural rigidity is achieved by use of a monofilament weft in the single ply polyester fabric material carcass of belt cover 112.

FIG. 2 is an enlargement of a portion of the embodiment of conveyor arrangement 100 shown in FIG. 1, and further illustrates in greater detail the attachment of the trailing and leading edges of belt cover 112 to form an endless cover that surrounds base conveyor belt 110. Elements of structure that have previously been discussed are similarly designated. As shown in this figure, trailing edge 112*b* of belt cover 112 is attached, in this embodiment of the invention, to leading edge 112*a* of belt cover 112 by a single-sided adhesive tape 122 on the upper surface and a further single-sided adhesive tape 124 on the underside, juxtaposed with base conveyor belt 110. In the practice of a specific illustrative embodiment of the invention, single-sided adhesive tapes 122 and 124 are formed of pressure sensitive satin acetate woven tape that permanently adheres the two edges from the bottom of the belt cover, and a top layer of the same material. In one embodiment of the invention, at least single-sided adhesive tape 122 is printed on the top side with information desired to be conveyed to an observer (not shown). Single-sided adhesive tape 122 permanently adheres to the top of the belt cover and covers the seam created by the leading and trailing edges of the belt cover.

Figure 3:
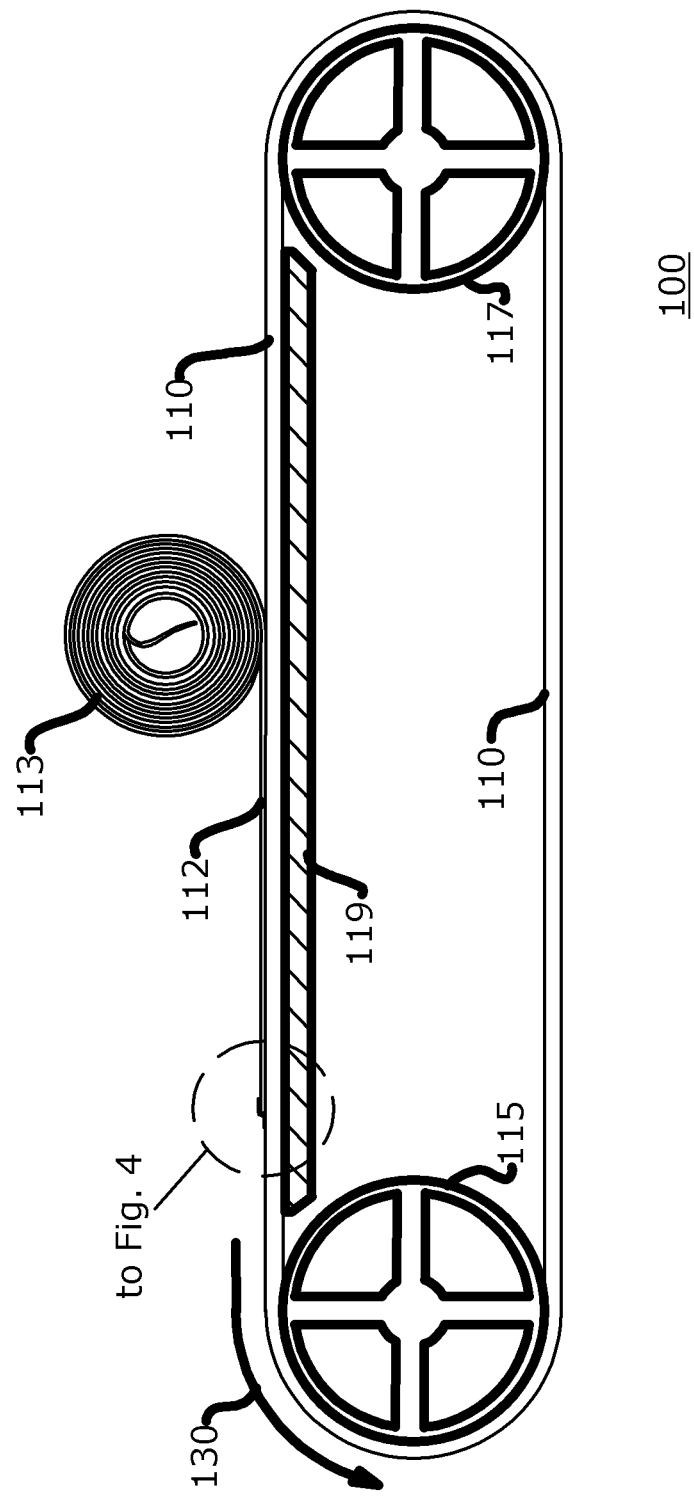
FIG. 3 is a simplified schematic representation of a conveyor arrangement constructed in accordance with the principles of the invention, that is useful in the context of a retail checkout conveyor, and further showing the preliminary steps in the installation of a cover over a base conveyor belt.

FIG. 3 is a simplified schematic representation of conveyor arrangement 100, and further shows the preliminary steps in the installation of belt cover 112 over base conveyor belt 110. Elements of structure that have previously been discussed are similarly designated. There is shown deposited on base conveyor belt 110 a roll of fabric material 113 that will form belt cover 112 once it has been installed on base conveyor belt 110. First, leading edge 112*a* (not specifically designated in this figure) is taped to base conveyor belt 110, as shown in FIG. 4.

Figure 4:
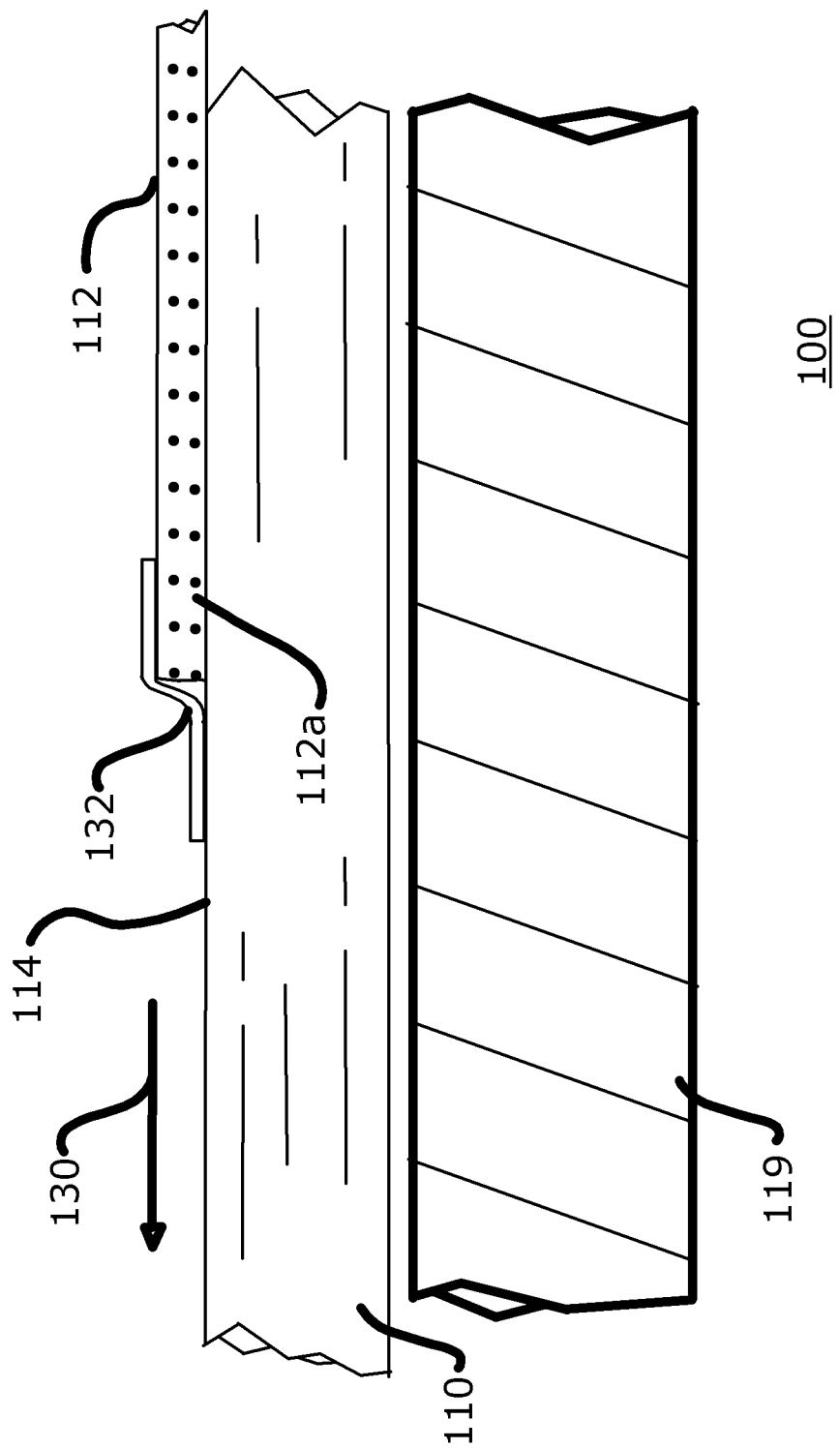
FIG. 4 is an enlargement of a portion of the embodiment of FIG. 3.

FIG. 4 is an enlargement of a portion of the embodiment of FIG. 3, and shows leading edge 112*a* to be attached temporarily to base conveyor belt 110 with removable single-sided adhesive tape 132. As shown in FIGS. 3 and 4, conveyor arrangement 100 is operated so that leading edge 112*a* is urged in the direction of arrow 130. Referring once again to FIG. 3, after leading edge 122*a* has traveled around rollers 115 and 117, and returned to top surface 114 (FIG. 4), trailing edge 112*b* is attached, in this further embodiment, to leading edge 112*a* as shown in FIG. 5.

Figure 5:
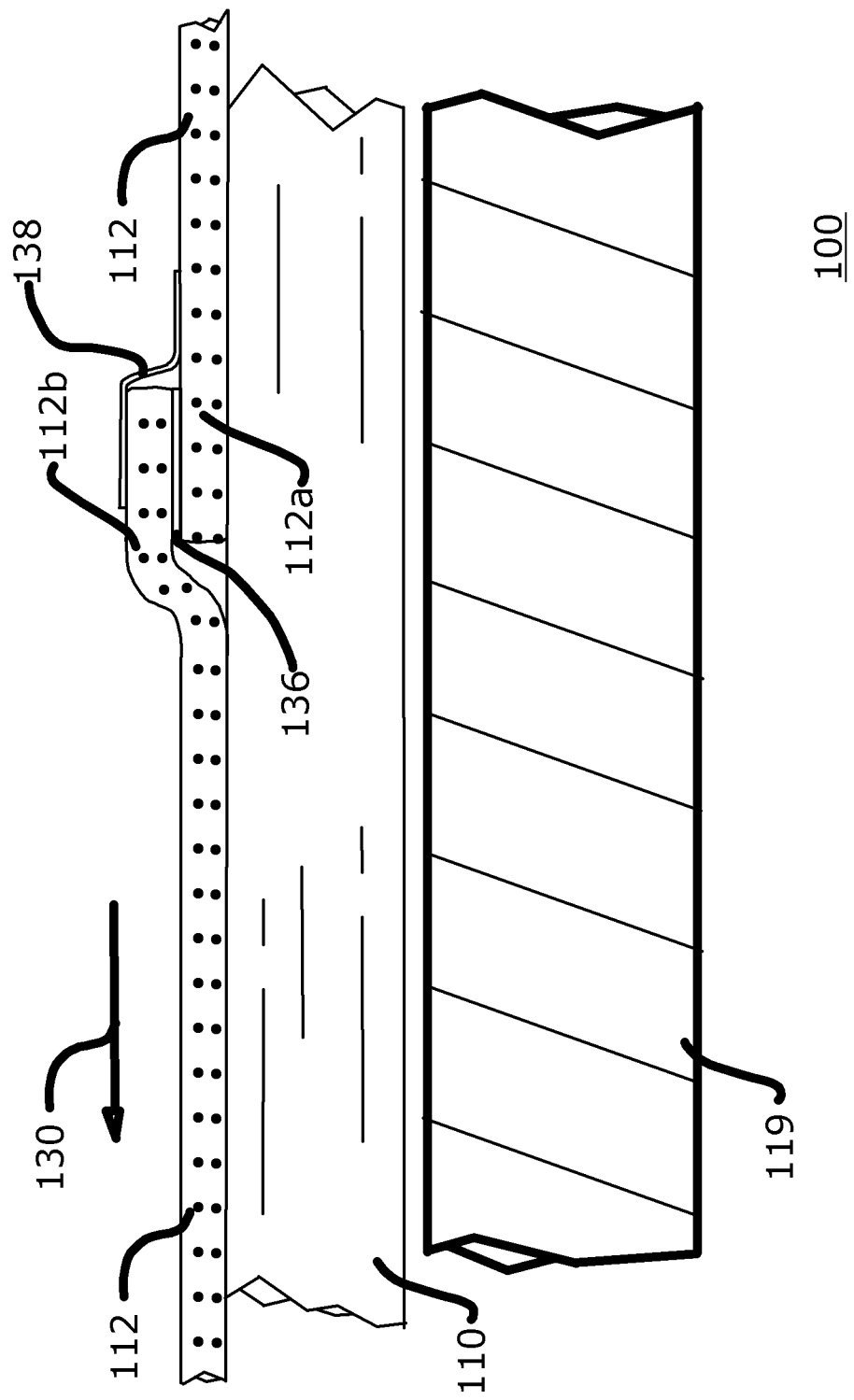
FIG. 5 is an enlarged simplified representation of the attachment between the leading and trailing edges of the cover applied over the base conveyor belt, in a specific illustrative embodiment of the invention.

FIG. 5 is an enlarged simplified representation of an alternative form of attachment between leading edge 112*a* and trailing edge 112*b* of belt cover 112 applied over base conveyor belt 110, in a further specific illustrative embodiment of the invention. Elements of structure that have previously been discussed are similarly designated. As shown in this figure, a strip of dual-sided adhesive tape 136 is installed over the outer surface of leading edge 122*a* of belt cover 112. Trailing edge 112*b* is adhered on its underside to the exposed side of dual-sided adhesive tape 136 in an overlap fashion. In one embodiment of the invention, dual-sided adhesive tape 136 is approximately one inch wide and extends the entire width of belt cover 112. The resulting seam is covered with a strip of single-sided adhesive tape 138 to form a permanent adhesion. In one embodiment, single-sided adhesive tape 138 is approximately two inches wide, and extends the entire width (not shown in this figure) of belt cover 112 (see, e.g., FIG. 7). The flexing and tensile forces applied to single-sided adhesive tape strips 122 and 124 in FIG. 2 are, in the embodiment of FIG. 5, applied as shear forces to dual-sided adhesive tape 136.

Figure 6:
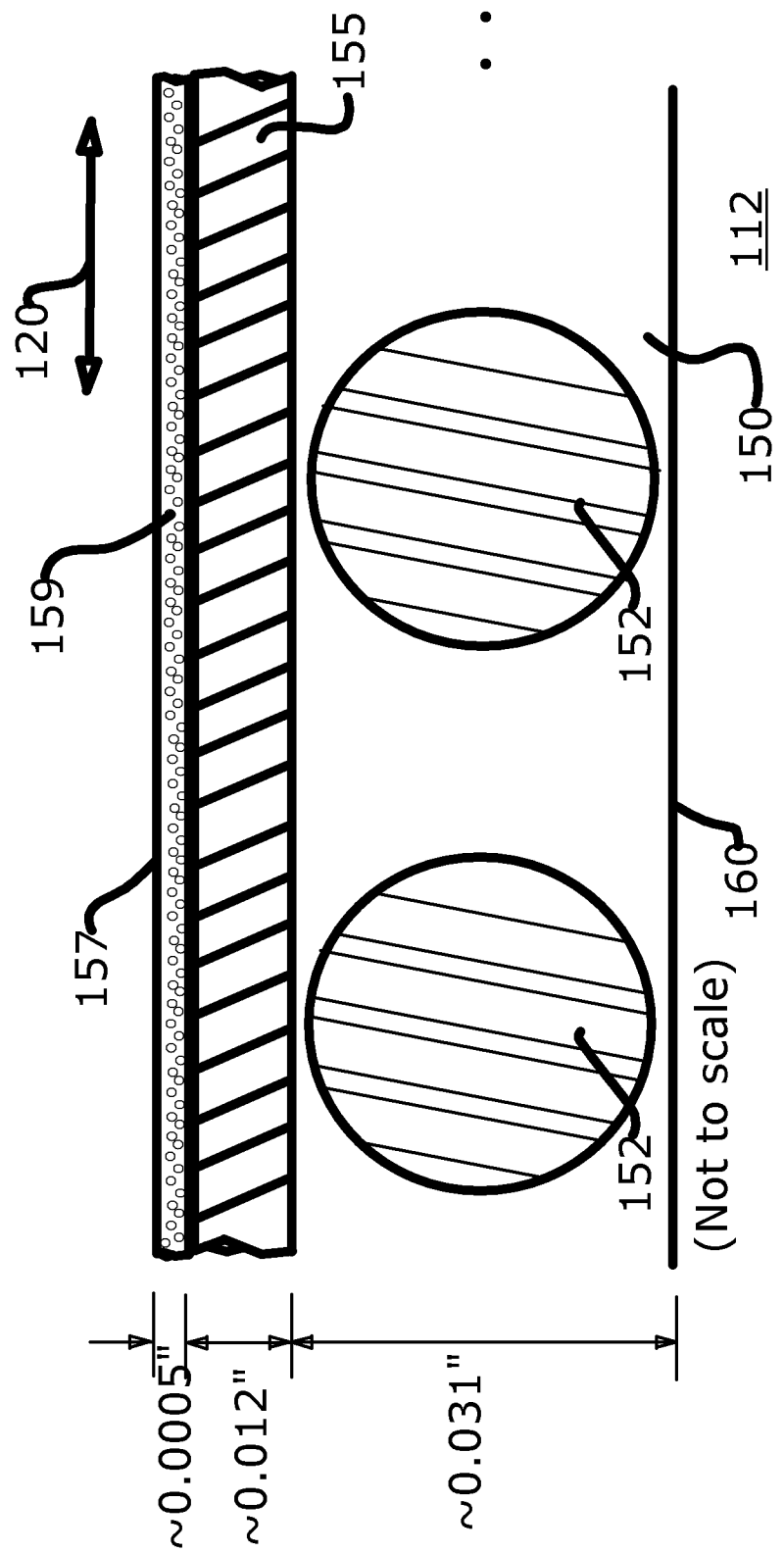
FIG. 6 is an enlarged cross-sectional representation of a fabric material that is useful as a cover over the base conveyor belt.

FIG. 6 is an enlarged, not to scale, cross-sectional simplified schematic representation of a fabric material that is useful as belt cover 112 disposed over the base conveyor belt (not shown in this figure) in a specific illustrative embodiment of the invention. As shown in this figure, conveyor belt cover 112 is formed of a fabric material carcass 150 that contains monofilament fibers 152 woven therein. This figure is a cross-sectional side view looking into the weft. Conveyor belt cover 112 travels in the directions of arrow 120, as hereinabove described.

This embodiment of conveyor belt cover 112 has a PVC coating 155 disposed over material carcass 150. In addition, there is provided a coating 157 in which are embedded non-degrading antimicrobial nanoparticles 159. The non-degrading antimicrobial nanoparticles were mixed into the coating while it was in a liquid state prior to being applied to the fabric material carcass. In a highly advantageous embodiment of the invention, the antimicrobial nanoparticles include silver anode particles of approximately between 4 and 6 nanometers in diameter.

In a specific illustrative embodiment of the invention, polyurethane coating 157 has a thickness of approximately ~0.0005"; PVC coating 155 has a thickness of approximately ~0.012"; and fabric material carcass 150 is a single ply material having a thickness of approximately ~0.031". The weft monofilament yarn has a cross-sectional diameter of approximately ~0.3 mm (~0.012"), and the warp yarn has a linear density of approximately ~1000 denier (~1100 decitex). There are approximately ~142 weft yarns per 10 cm, and ~106 warp yarns per 10 cm.

In one embodiment of the invention, PVC coating 155 has a hardness characteristic of approximately durometer ~75. An electrostatically conductive thread (not shown) can optionally be woven into the weft or warp of fabric material carcass 150. Other characteristics of the combination of materials used in belt cover 112 are that the top surface (not specifically designated) has a satin finish (not shown in this figure); no coating is applied to under surface 160 of fabric material carcass 150 in order to achieve a desired maximum dry coefficient of friction with the base conveyor belt of approximately between ~0.47 and ~0.52, as hereinabove set forth; and that the fabric material has a weight characteristic in this illustrative embodiment of approximately ~0.015812 lbs/in-ft.

In one embodiment, the ability of the specific conveyor belt cover herein described to become elongated in response to the application of tensile force is approximately ~0.4% at 12 lbs/in; ~0.7% at 24 lbs/in; and ~2.0% at 45 lbs/in.

Figure 7:
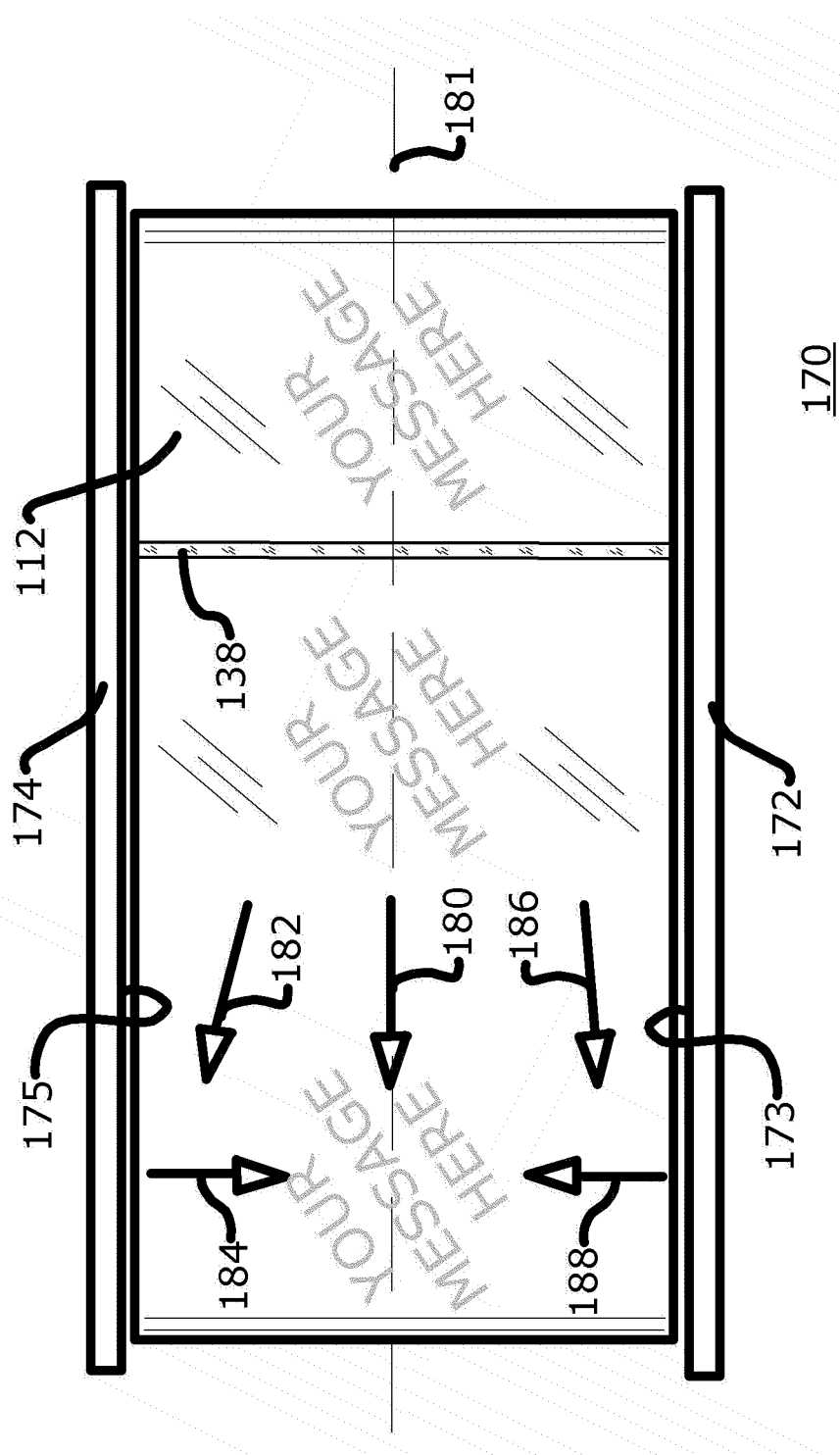
FIG. 7 is a simplified schematic top plan representation of a retail check stand embodiment of the invention that is useful in describing a self-alignment aspect of the present invention.

FIG. 7 is a simplified schematic top plan representation of a retail check stand 170 embodiment of the invention that is useful in describing the self-alignment aspect of the present invention. Elements of structure that have previously been discussed are similarly designated. As shown in this figure, retail check stand 170 has belt cover 112 overlying a base conveyor belt (not shown in this figure). Belt cover 112 is disposed between side rails 172 and 174. Side rail 172 has an inner rail surface 173, and side rail 174 has an inner rail surface 175. In this specific illustrative embodiment of the invention, belt cover 112 is arranged to convey articles (not shown) in the direction of arrow 180, substantially along axis 181. Persons of skill in the art will understand, however, that the principles of this aspect of the invention are applicable in a bidirectional embodiment of the invention (not shown).

A misalignment occurs when belt cover 112 travels off of axis, illustratively in the direction of arrow 182, which is shown to be directed in a direction that is transverse to axis 181. Such misalignment will cause belt cover 112 to communicate with inner rail surface 175. As a result of the physical characteristics of belt cover 112, as hereinabove described, belt cover 112 is urged back to alignment (i.e., in the direction of arrow 184), without buckling or wrinkling. Similarly, misalignment resulting from travel of belt cover 112 in the direction of arrow 186, which also is directed transverse to the axis of conveyance, will cause the belt cover to communicate with inner rail surface 173, and consequently to be urged into realignment in the direction of arrow 188.

As noted, belt cover 112 communicates frictionally with the base conveyor belt (not shown in this figure), and therefore is displaceable in all directions with respect to the base conveyor belt. The self-alignment characteristic of the present invention is effected by permitting belt cover 112 to be multidirectionally displaceable over the base conveyor belt. More specifically, the conveyor belt cover is displaceable with respect to the base conveyor belt not only in the axial direction (i.e., in the direction of conveyance), but also transaxially, and has adequate structural rigidity to be urged back into alignment, as herein described, without excessive distortion.

The specific illustrative embodiment of the invention represented in this FIG. 7 additionally shows that indicia (not specifically designated) is installed on belt cover 112. In this embodiment, the indicia is generically represented as "YOUR MESSAGE HERE." However, any personal or commercial material, including advertising and graphics, are included within the scope of the invention.

Figure 8:
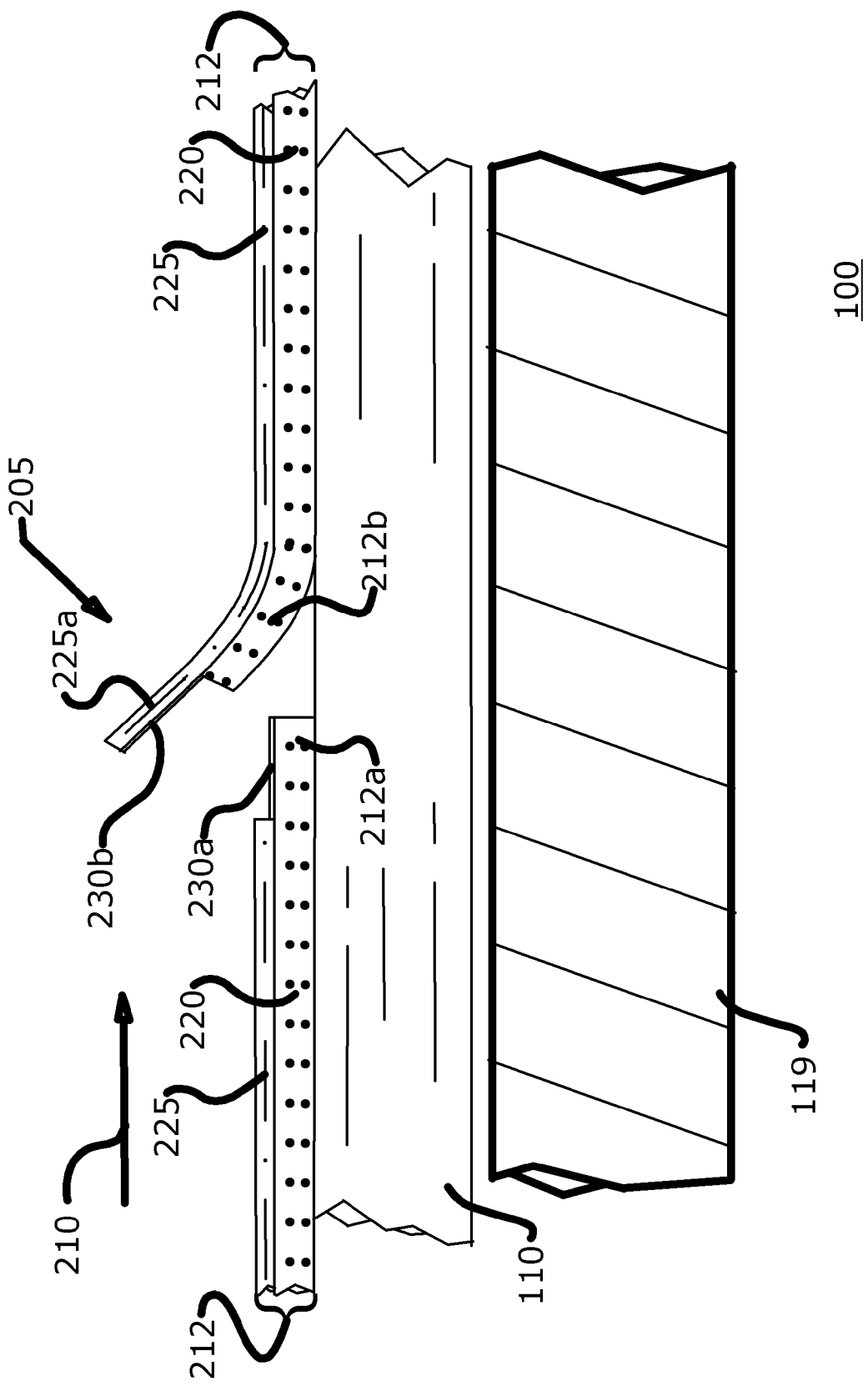
FIG. 8 is a simplified schematic representation of an advantageous arrangement for coupling the leading and trailing edges of the cover applied over the base conveyor belt.

FIG. 8 is a simplified schematic representation of an advantageous arrangement for coupling the leading and trailing edges of the cover applied over a base conveyor belt 212 in the region of a seam 205. Elements of structure that have previously been discussed are similarly designated. As shown in this figure, there is provided an alternative form of attachment between leading edge 212a and trailing edge 212b of belt cover 212 that is, as previously described, applied over base conveyor belt 110. The belt cover, as well as base conveyor belt 110, travel in the direction represented by arrow 210. In this specific illustrative embodiment of the invention, belt cover 212 is shown to be formed of at least two layers, including a polyester carcass layer 220, in the form of an inner ply, and a PVC cover layer 225, in the form of an outer ply. Except for the region of seam 205, the two layers are juxtaposed to form overall belt cover 212.

In this specific illustrative embodiment of the invention, PVC cover layer 225 is shown to be split from polyester carcass layer 220, and the PVC cover layer 225 is trimmed off of leading edge 212a, in the region of seam 205. On trailing edge 212b, the PVC cover layer 225 is split off from polyester carcass layer 220 and the carcass is trimmed back in the region of seam 205. In this embodiment, an adhesive 230a is applied to the exposed portion of polyester carcass layer 220 and an adhesive 230b is applied to the underside of the exposed portion of PVC cover layer 225 on trailing edge 212b. In some embodiments of the invention, adhesives 230a and 230b are the same, but in other embodiments, the adhesives differ from one another, as would be the case with known two-part adhesive systems.

During installation of belt cover 212 onto base conveyor belt 110 of slider bed 119 of a check stand (not shown), it may occur that trailing edge 225a of PVC cover layer 225 is too long. In that event, trailing edge 225a of PVC cover layer 225 will be cut using a straight edge tool (not shown) and an Ultra High Molecular Weight Polyethylene (UHMW) board (not shown) so that PVC cover layer 225 aligns with the leading edge 212a of polyester carcass layer 220 at seam 205.

Once it is ascertained by visual inspection that the correct alignment has been achieved, adhesives 230a and 230b are activated using any of heat or a chemical activator, and leading edge 212a and trailing edge 212b would thereby securely be attached together. In some embodiments, the resulting coupling at seam 205 is rolled with a pressure roller (not shown) or a stitcher (not shown) to ensure that the adhesive coupling is secure and permanent. In this manner, the coupling of the leading and trailing edges is completed.

In a practicable embodiment of the invention, the region of leading edge 212a that is provided with adhesive 230a has a length of approximately one inch, and a width that corresponds to the width of the belt. Similarly, trailing edge 225a of PVC cover layer 225 also has a length of approximately one inch. However, in some embodiments of the invention, trailing edge 225a can have a length of up to approximately three inches. The additional length of trailing edge 225a is useful to bridge the leading and trailing edges of polyester carcass layer 220.

In the event that the trailing and leading edges of polyester carcass layer 220 do not lie in close proximity to one another such that trailing edge 225a of PVC cover layer 225 has no underlying carcass supporting it, trailing edge 225a of PVC cover layer 225 might, in some embodiments, not have the tensile strength to prevent the PVC cover layer from tearing. In such a situation, a further alternative coupling arrangement is provided in accordance with the invention.

Figure 9:
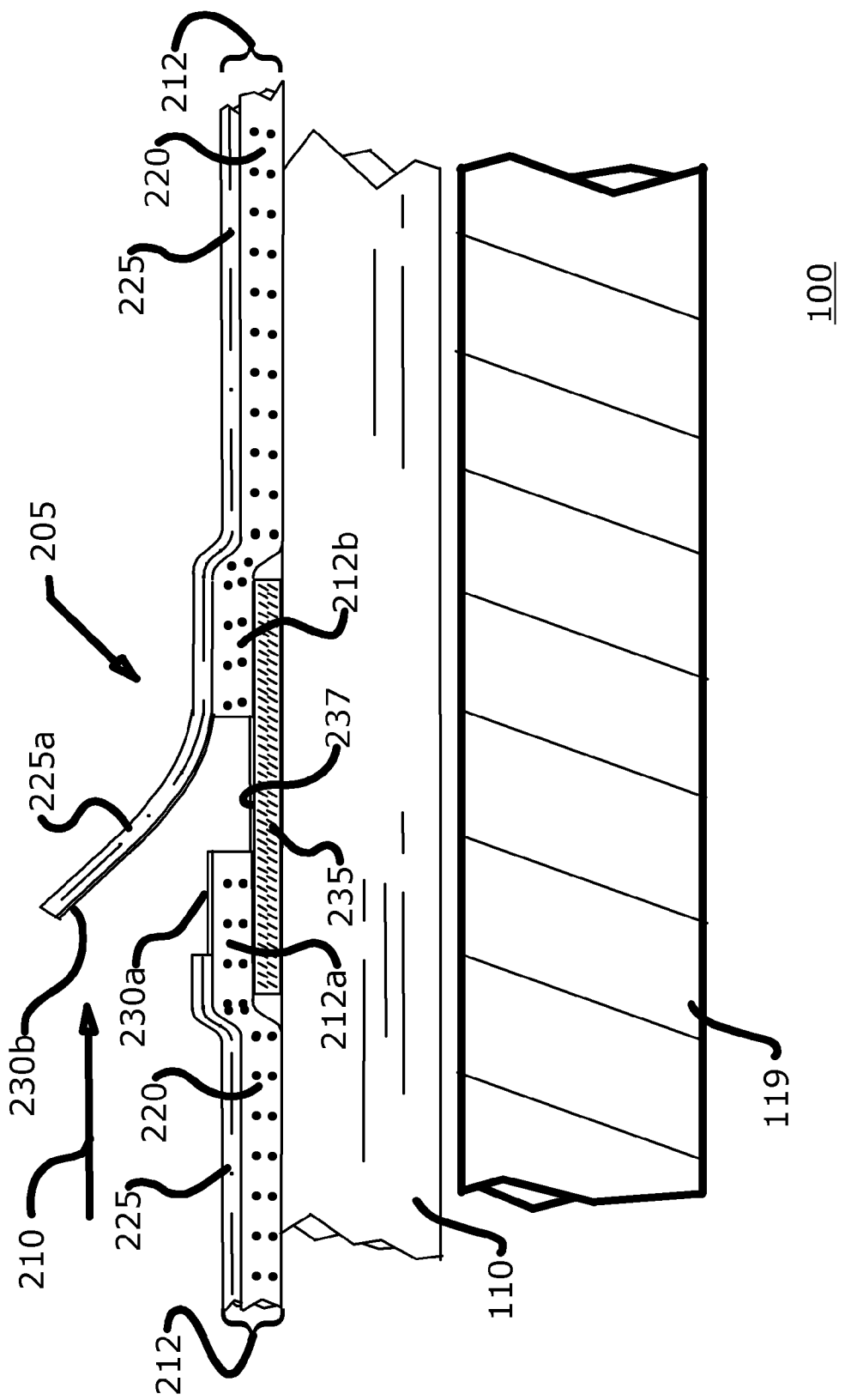
FIG. 9 is a simplified schematic representation of a further advantageous arrangement for coupling the leading and trailing edges of the cover applied over the base conveyor belt.

FIG. 9 is a simplified schematic representation of a further advantageous arrangement for coupling the leading and trailing edges of the cover applied over the base conveyor belt, in the case where trailing edge 225a of PVC cover layer 225 has no carcass thereunder to support it. Elements of structure that have previously been discussed are similarly designated. There is shown in this figure an additional piece of material substrate 235 that is adhered by an adhesive 237 to the bottom of trailing edge 212b of polyester carcass layer 220, and thereby provide additional support to trailing edge 225a of PVC cover layer 225. This arrangement, as noted, is advantageous when it is determined that trailing edge 225a of PVC cover layer 225 being unsupported by polyester carcass layer 220 does not have adequate tensile strength to keep trailing edge 225a from tearing during operation of the check stand (not shown).

Although the invention has been described in terms of specific embodiments and applications, persons skilled in the art may, in light of this teaching, generate additional embodiments without exceeding the scope or departing from the spirit of the invention described and claimed herein. Accordingly, it is to be understood that the drawing and description in this disclosure are proffered to facilitate comprehension of the invention, and should not be construed to limit the scope thereof.

What is claimed is:

1. A method of installing a conveyor belt cover over an existing base conveyor belt on a conveyor arrangement of the type having a plurality of conveyor rollers, the base conveyor belt being arranged to be urged endlessly around the plurality of conveyor rollers, the method comprising:

placing a two-ply conveyor belt cover formed of a fabric carcass having inner and outer plies on said existing base conveyor belt, the conveyor belt cover having first and second ends on the existing based conveyor belt;

forming a temporary attachment of the first end of the conveyor belt cover to a top surface of said base conveyor belt;

urging said base conveyor belt and attached conveyor belt cover around the plurality of conveyor rollers in a forward direction of travel until the first end of the conveyor belt cover approaches the second end of the conveyor belt cover;

attaching the first and second ends of the conveyor belt cover to form an endless loop; and removing the temporary attachment to said base conveyor belt so that the conveyor belt cover is in frictional communication with said base conveyor belt.

2. The method of claim 1 wherein, the step of attaching the first and second ends of the conveyor belt cover to form an endless loop comprises:

removing a portion of the inner ply in the region of the first end of the two-ply cover;

removing a portion of the outer ply in the region of the second end of the two-ply cover;

applying an adhesive to at least one of the exposed portions of the inner and outer plies; and overlying the outer ply over the inner ply over the applied adhesive.

3. The method of claim 2, wherein said step of removing a portion of the inner ply in the region of the first end of the two-ply cover extends for approximately one inch in the direction of travel and across the entire width in the direction perpendicular to the direction of travel.

4. The method of claim 3, comprising the further step of attaching a material substrate to the underside of the first and second edges to provide support.

5. The method of claim 1 wherein, the step of attaching the first and second ends of the conveyor belt cover to form an endless loop comprises:

urging said base conveyor belt and attached conveyor belt cover until the first end of the conveyor belt cover abuts the second end of the conveyor belt conveyor belt cover to form a seam;

applying a single-sided adhesive tape to the underside of the conveyor belt cover at the seam to permanently adhere the two edges of the conveyor belt cover together; and applying a single-sided adhesive tape to the upper surface of conveyor belt further adhere the two edges of the conveyor belt cover together and to cover the seam.

6. The method of claim 1 wherein, the step of attaching the first and second ends of the conveyor belt cover to form an endless loop comprises:

adhering the underside of the second end to the upper side of the first end to form a seam at the overlap with dual-sided adhesive tape; and covering the seam with a single-sided adhesive tape.

7. The method of claim 1 wherein said step of attaching the first and second ends of the conveyor belt cover to form an endless loop includes applying a tensile force to the conveyor belt cover material of approximately between 1 pound/inch and 1.5 pounds/inch.

8. The method of claim 7 wherein the step of applying a tensile force comprises stretching the conveyor belt cover material to an elongation of approximately 0.1%.

9. A conveyor arrangement of the type having a plurality of conveyor rollers and a base conveyor belt arranged to be urged endlessly around the plurality of conveyor rollers, the conveyor arrangement comprising:

a conveyor belt cover formed of inner and outer plies, the conveyor belt cover being arranged to overlie the base conveyor belt and to be urged endlessly around said plurality of conveyor rollers, the inner ply having first and second inner ply termination edges and being arranged to directly overlie, and to be in frictional communication with, and multidirectionally displaceable over, the base conveyor belt, the first and second inner ply termination edges being arranged in proximity to one another to form a closed loop that overlies the base conveyor belt; and the outer ply being arranged to overlie the inner ply and having first and second outer ply termination edges, the first outer ply termination edge extending beyond the first inner ply termination edge, and the second outer ply termination edge being disposed to leave a portion of the second inner ply termination edge exposed.

10. The conveyor arrangement of claim 9, wherein said inner ply is formed of a single ply polyester fabric material carcass.

11. The conveyor arrangement of claim 9, wherein said outer ply is formed of has a PVC coating.

12. The conveyor arrangement of claim 9, wherein said conveyor belt cover has a structural rigidity characteristic greater than 140 p/cm2 as determined in accordance with DIN 53362 in the weft direction.

13. The conveyor arrangement of claim 9, wherein the inner ply of said conveyor belt cover has an inner surface for forming the frictional communication with said base conveyor belt, and an outer surface for communicating with an inner surface of the outer ply.

14. The conveyor arrangement of claim 9, wherein said conveyor belt cover is installed to a tensile force of approximately between 3 and 4.5 pounds/inch.

15. The conveyor arrangement of claim 14, wherein the tensile force applied to said conveyor belt cover corresponds to an elongation of approximately 0.2%.

16. The conveyor arrangement of claim 13, wherein the frictional communication between the inner surface of the inner ply said conveyor belt cover and said base conveyor belt corresponds to a coefficient of friction of approximately between 0.12 and 0.16.

17. The conveyor arrangement of claim 9, wherein there is further provided a message printed on the outer surface of the outer ply of said conveyor belt cover.

18. The conveyor arrangement of claim 13, wherein there is further provided an antimicrobial material disposed on the outer surface of the outer ply of said conveyor belt cover.

19. The conveyor arrangement of claim 18, wherein said antimicrobial material comprises a selectable combination of silver and silver oxide nanoparticles embedded in a polymeric film.

20. The conveyor arrangement of claim 19, wherein said antimicrobial material further comprises zinc oxide particles embedded in said polymeric film.

21. The conveyor arrangement of claim 19, wherein said polymeric film includes a polymer selected from the group consisting of a polyurethane, a vinyl, an acrylic, a polyester, a melamine, a polyolefin, a polycarbonate, and an epoxy.

22. The conveyor arrangement of claim 21, wherein said polymeric film has a thickness of approximately ~0.5 mil.

23. The conveyor arrangement of claim 9, wherein there is further provided an adhesive applied to the second inner ply termination edge, and to the first outer ply termination edge.

24. The conveyor arrangement of claim 23, wherein said adhesive is activated after the second inner ply termination edge is brought into communication with the first outer ply termination edge.

25. The conveyor arrangement of claim 9, wherein there is further provided a substrate portion arranged to underlie the first and second inner ply termination edges.

26. The conveyor arrangement of claim 9, wherein the outer ply overlies the inner ply approximately one inch.

* * * * *